United States Patent [19]

Tokas

[11] 4,330,635

[45] May 18, 1982

[54] FOAMABLE POLYMERIC COMPOSITION

[75] Inventor: Edward F. Tokas, Kirkwood, Mo.

[73] Assignee: Monsanto Company, St. Louis, Mo.

[21] Appl. No.: 216,572

[22] Filed: Dec. 15, 1980

Related U.S. Application Data

[62] Division of Ser. No. 137,161, Apr. 4, 1980, abandoned.

[51] Int. Cl.$^3$ .............................................. C08J 9/00
[52] U.S. Cl. ...................................... 521/79; 521/93; 521/97; 521/147
[58] Field of Search ..................... 521/79, 93, 97, 147

[56] References Cited

U.S. PATENT DOCUMENTS 2,911,382  11/1959  Barkhuff, Jr. et al. ............... 521/94
3,277,029  10/1966  Chadwick et al. ................... 521/97

FOREIGN PATENT DOCUMENTS 903564  8/1962  United Kingdom ................ 521/92

Primary Examiner—Morton Foelak
Attorney, Agent, or Firm—Joseph S. Nelson; William J. Farrington; Paul D. Matukaitis

[57] ABSTRACT

The invention relates to a foamable polymeric composition comprising a copolymer of alkenyl aromatic and alkenyl nitrile monomers, optionally a diene rubber grafted with said monomers and a foaming agent selected from a polybasic acid group. A method for foaming said polyblend is also disclosed.

7 Claims, No Drawings

FOAMABLE POLYMERIC COMPOSITION

This is a division of application Ser. No. 137,161, filed Apr. 4, 1980, now abandoned.

BACKGROUND OF THE INVENTION

Structural foam plastics are being developed for appliance, automotive and furniture uses providing lower cost, light-weight products having high utility. Such products are molded from compositions that will foam under molding conditions wherein the gas liberating agent will provide gases in situ, at elevated molding temperatures, that blow the molded composition reducing its density by 2 to 50%.

Such foamable moldable compositions will fill injection molds readily, however, the set-up or cooling time in the mold has been longer than for conventional molding causing molding costs to be higher, offsetting the lower material cost advantages.

It is the objective of the present invention to provide foamable polyblend compositions that can be foamed and molded simultaneously with shorter cycles than conventional foamable polymeric materials.

U.S. Pat. No. 3,268,636 discloses a process for the injection molding of foamed plastic articles, teaching the general concept of molding foamable plastic using thermoplastics and various blowing agents.

The present invention relates to moldable foamable polymeric compositions of relative high density that can be used as structural tough molded articles for furniture, appliances and automotive. Styrenic plastics such as styrene-acrylonitrile copolymers and rubber reinforced polymers (ABS) are used conventionally for such molded articles having high modulus and toughness along with excellent melt flow properties for molding. Such materials when foamed with aliphatic blowing agents are plasticized with the blowing agents, hence, lose modulus and more importantly have longer set-up times or molding cycles.

Beyond molding, the invention also relates to foamable polymeric compositions that can be extruded into various profiles such as sheet, conduits, plank, etc., that can have foamed thick sections which have a tendency to lose dimensional stability and/or collapse if the blowing or foaming system is not optimum for the polymeric composition.

It is known to foam alkenyl aromatic polymers with hydrocarbons or other volatile fluid foaming agents that boil below about 100° C. Such foaming systems have used nucleating systems to insure fine cell size structure. Such nucleating systems include compounds that will decompose to form carbon dioxide and nitrogen, e.g. bicarbonates activated by organic acids or various azo compounds. Such nucleating systems, however, have not been found to be efficient as blowing systems for alkenyl aromatic polymers and have been used with hydrocarbons.

U.S. Pat. No. 3,960,792 has disclosed blowing systems for polyalkenyl aromatic polymer such as polystyrene and finds that carbon dioxide systems will foam polystyrene, however, foam collapse in thick sections causes loss of dimensional stability, hence, certain halogenated hydrocarbons are used.

U.S. Pat. No. 3,344,092 discloses mixed carbonate and bicarbonate salts used with organic acids and hydrocarbons will foam polystyrene, however, the ratio of carbonates, bicarbonates and organic acids are critical to forming fine cell structures. Carbonates or bicarbonates used alone with organic acids given nonuniform large cell foams.

The prior art then discloses that foaming systems for a particular polymeric composition are not readily adapted to other polymer systems and that all foaming agents within a class are not mere equivalents even for the same polymeric composition.

It has been found, unexpectedly, that polybasic acids have the ability to foam alkenyl aromatic-alkenyl nitrile polymers in thick sections without collapse of the cells maintaining a fine, closed cell, structure having superior dimensional stability.

SUMMARY OF THE INVENTION

The present invention relates to:

A foamable polymeric composition consisting essentially of:

A. a copolymer of monoalkenyl aromatic and alkenyl aromatic monomers,

B. optionally, a diene rubber grafted with said monomers, and

C. a foaming agent, selected from the polyacid group consisting of citric, oxalic, succinic, tartaric, glutaric, malic and malonic or salts thereof.

The present invention also relates to a method for foaming a polymeric composition of:

A. a copolymer of alkenyl aromatic and alkenyl nitrile monomers,

B. optionally, a diene rubber grafted with said monomers, and

C. a foaming agent selected from the polyacid group consisting of citric, oxalic, succinic, tartaric, glutaric, malic, malonic or mixtures thereof as the sole blowing agent comprising the steps: blending (A), (C) and optionally (B) by melt colloiding at temperatures of about 150° to 325° C. under super-atmospheric pressure, passing said colloided melt into a zone of lower pressure, allowing said polymeric composition to foam to a density of 2 to 60 lbs. per cu.in., as a closed cell foamed composition having dimensional stability when cooled.

PREFERRED EMBODIMENTS

The alkenyl aromatic monomers can be selected from the group consisting of styrene, alpha methyl styrene, halogenated alkenyl aromatic such as chlorostyrene and bromostyrene or mixtures thereof. The alkenyl nitrile monomers can be selected from the group consisting of acrylonitrile and methacrylonitrile or mixtures thereof. The copolymers of alkenyl aromatic and alkenyl nitrile monomers have a weight ratio of said monomers of 85:15 to 15:85 respectively.

The diene rubbers are rubbers of conjugated diene monomers, said rubbers being selected from the group consisting of polybutadiene, polyisoprene, polychloroprene and copolymers of butadiene-styrene, butadiene-acrylonitrile wherein the butadiene moiety is greater than 50% preferably greater than 75%.

The grafted diene rubbers are the disclosed diene rubbers grafted with monomers selected from the group consisting of alkenyl aromatic, alkenyl nitrile or mixtures thereof. Said rubber is dispersed in said alloy as rubber particles grafted with about 10 to 100 parts of said monomer per 100 parts of rubber having a particle size of about 0.05 to 1.5 microns. Alternatively, the rubber can be dispersed as rubber particles being grafted with and having occluded polymers of said monomers wherein said grafted and occluded polymers are present in amounts of from about 0.5 to 5 parts per 100 parts of rubber, said rubber particles having a particle size of about 0.5 to 30 microns. The particle size is a weight average particle size diameter as determined by a Centrifugal Photosedimentometer (Model 3000 Particle Size Analyzer from Martin Sweets Co., 3131 West Market Street, Louisville, Ky.). The grafted diene rubbers can be present in said alloy in amounts such that the diene rubber moiety is present in amounts of about 2 to 35% by weight of said alloy.

Styrene-acrylonitrile copolymers including rubber modified SAN polymer or ABS can be prepared by methods disclosed in ABS Plastics by C. H. Basdekis, Reinhold Publishing Corp., New York, N.Y., or U.S. Pat. No. 3,509,237 and are hereby included by reference.

Such ABS materials have a styrene-acrylonitrile (SAN) copolymer matrix phase having dispersed therein diene rubber particles grafted with S/AN monomers as a polyblend. The grafted rubber phase is present in an amount of 2 to 35% by weight as a rubber moiety. The rubber particles can have a weight average diameter of about 0.5 to 1.5 microns being grafted with 10 to 100 parts of monomers per 100 parts of rubber. Alternatively, the rubber particles can be grafted with and have occluded SAN copolymers in amounts of 0.5 to 5 parts per part of rubber as disclosed supra.

The foaming agents of the composition are polyacids selected from the group consisting of citric, oxalic, succinic, tartaric, glutaric, malic and amlonic or mixtures thereof.

These acids can be hydrated or anhydrous, e.g., citric acid .$H_2O$ oxalic acid .$2H_2O$. The acids can also be used in the salt form having cations selected from the group consisting of potassium, sodium and calcium. The acids or their salts are present in said compositions in sufficient amounts to provide a foamed composition having a density of about 2 to 60 lbs./cu.ft., being present in said foamable polymeric composition in an amount of about 0.2 to 10% by weight based on said composition. The polyacids are solids that decompose readily at the extrusion or molding temperatures used for said polymers. Extrusion and molding temperatures range from about 150° to 325° C.

EXAMPLE 1

A styrene-acrylonitrile (SAN) copolymer having a molecular weight of about 150,000, a weight ratio of styrene to acrylonitrile of 75:25 was dry blended with 1.4% by weight of citric acid (anhydrous). The blend was extrusion injection molded at 530° F. (277° C.) into $\frac{1}{2} \times \frac{1}{2} \times 5''$ foamed bars. The extrusion injection molding machine used was a one-ounce Arburg Allrounder Machine solid by Polymer Machinery Corp., Berlin, Conn. The bars had a density of about 30.4 lbs/cu.ft. and after aging 48 hours the bars showed little dimensional change, fine, closed cell size of uniform distribution and had an impact strength of about 0.38 ft.lbs. per inch of notch (ASTM Test D-256-56) providing a tough foamed article of great utility. Bars molded from the SAN copolymer without foaming had an impact strength of about 0.4 ft.lbs./in. showing that the uniformly foamed bars having a density about 50% of the SAN polymer retained excellent toughness and dimensional stability when foamed with the present process.

EXAMPLES 2–11

Example 1 was repeated using SAN polymers having different S/AN ratios and different foaming agents. The different formulations and results are shown in Table I.

TABLE I

| | | | Density (lbs./cu. ft.) | | |
|---|---|---|---|---|---|
| Ex. | Foaming Agent | Weight % | S/AN 75/25 | S/AN 68/32 | S/AN 32.68 |
| 2 | control | — | 67.3 | 66.5 | 62.2 |
| 3a | Citric Acid[1] | 1.4 | 31.1 | 30.2 | 22.6 |
| 3b | | 5.0 | 10.2 | 9.5 | 6.3 |
| 4 | Citric Acid . $H_2O$ | 1.5 | 36.4 | 35.1 | 27.9 |
| 5 | Oxalic Acid . $2H_2O$ | 0.98 | 50.2 | 49.7 | 41.7 |
| 6a | Calcium Oxalate . $H_2O$ | 1.1 | 56.4 | 55.2 | 49.3 |
| 6b | | 5.0 | 15.6 | 14.3 | 10.1 |
| 7a | Succinic Acid | 1.0 | 48.1 | 47.6 | 39.8 |
| 7b | | 5.0 | 23.2 | 21.5 | 15.6 |
| 8 | Malic Acid | 1.0 | 47.5 | 46.3 | 38.6 |
| 9 | Glutaric Acid | 1.0 | 49.2 | 48.6 | 49.1 |
| 10a | Tartaric Acid | 1.0 | 46.2 | 44.6 | 36.3 |
| 10b | | 5.0 | 22.1 | 21.3 | 15.7 |
| 11 | Malonic Acid | 1.0 | 50.6 | 49.2 | 40.9 |

It is evident from the data that the higher the acrylonitrile control of the SAN copolymer the lower the density of the foam. This appears to correspond to the lower transmission of carbon dioxide in high acrylonitrile copolymers, hence, more carbon dioxide remains in the foaming composition to provide lower density and more importantly stabilize the foamed polymeric composition to foam collapse or dimensional distortion, particularly in thick sections. It was observed that all of the foamed pieces retained dimensional stability on aging.

EXAMPLES 12–16

Example 1 was repeated using ABS polyblend as the polymeric system. The ABS polyblend contained about 20% by weight of butadiene rubber grafted with about 100 parts of SAN copolymer per 100 parts of rubber and about 60% by weight SAN copolymer as a matrix phase. The SAN graft and matrix copolymers having 76:24 weight ratio of styrene to acrylonitrile in their composition.

The ABS was dry blended with the foaming agents and extrusion molded with various foaming agents with the formulation and test data shown in TABLE II.

TABLE II

| Ex. | Foaming Agent | Weight % | Density lbs./cu. ft. |
|---|---|---|---|
| 12 | control | — | 65.3 |
| 13 | citric acid | 1.5 | 32.3 |
| 14 | citric acid | 5.0 | 8.9 |
| 15 | calcium oxalate | 1.1 | 53.2 |
| 16 | calcium oxalate | 5.0 | 13.7 |

It is evident that the ABS polyblend can be foamed with polybasic acids to a wide range of densities. The foamed parts were found to have fine closed cell foam structures with no dimensional distortion on aging.

What is claimed is:

1. A method for foaming a polymeric composition of:
   A. a copolymer of alkenyl aromatic and alkenyl nitrile monomers,
   B. optionally, a diene rubber grafted with said monomers, and C. a foaming agent selected from the polyacid group consisting of citric, succinic, tartaric, glutaric, malic, malonic or salts and mixtures thereof in their anhydrous form as the sole blowing agent comprising the steps: blending (A), (C) and optionally (B) by melt colloiding at temperatures of about 15° to 325° C., under super-atmospheric pressure, passing said colloided melt into a zone of lower pressure, allowing said polymeric composition to foam to a density of 2 to 60 lbs. per cu.in., as a closed cell foamed composition having dimensional stability when cooled.

2. A method of claim 1 wherein said monoalkenyl aromatic monomer is styrene, aralkyl styrene, arhalostyrene, alpha methyl styrene and mixtures thereof.

3. A method of claim 1 wherein said alkenyl nitrile monomer is acrylonitrile, alphamethyl, acrylonitrile or mixtures thereof.

4. A method of claim 1 wherein said diene rubber is polybutadiene, polychloroprene, polyisoprene, copolymers of butadiene-styrene, butadiene-acrylonitrile and mixtures thereof.

5. A method of claim 1 wherein said foaming agent is a salt of said polybasic acids selected from the group consisting of sodium, potassium, magnesium and calcium.

6. A method of claim 1 wherein the weight ratio of alkenyl aromatic to alkenyl nitrile monomers is about 85:15 to 15:85 in said copolymer.

7. A method of claim 1 wherein said foaming agent is present in amounts of about 0.2 to 10% by weight based on said composition.

* * * * *